(12) United States Patent
Rehtanz et al.

(10) Patent No.: US 7,096,175 B2
(45) Date of Patent: Aug. 22, 2006

(54) STABILITY PREDICTION FOR AN ELECTRIC POWER NETWORK

(75) Inventors: Christian Rehtanz, Baden-Dättwil (CH); Valentin Bürgler, Endingen (CH); Joachim Bertsch, Baden-Dättwil (CH)

(73) Assignee: ABB Research LTD, Zurich (CH)

( * ) Notice: Subject to any disclaimer, the term of this patent is extended or adjusted under 35 U.S.C. 154(b) by 822 days.

(21) Appl. No.: 10/144,069

(22) Filed: May 14, 2002

(65) Prior Publication Data

US 2003/0040846 A1    Feb. 27, 2003

(30) Foreign Application Priority Data

May 21, 2001    (EP)    .................................. 01112354

(51) Int. Cl.
*G06G 7/54*    (2006.01)

(52) U.S. Cl. ......................................... 703/18; 700/293

(58) Field of Classification Search .................... 703/2, 703/18; 700/286, 293; 307/102, 20, 31, 307/38, 132 EA See application file for complete search history.

(56) References Cited

U.S. PATENT DOCUMENTS

| | | | |
|---|---|---|---|
| 5,566,085 A | | 10/1996 | Marceau et al. |
| 5,625,751 A | * | 4/1997 | Brandwajn et al. ............ 706/20 |
| 5,638,297 A | * | 6/1997 | Mansour et al. ............ 700/286 |
| 5,719,787 A | * | 2/1998 | Chiang et al. ............... 700/293 |
| 6,202,041 B1 | * | 3/2001 | Tse et al. ....................... 703/13 |

OTHER PUBLICATIONS

Chiou, et al., "Development of a Micro-processor-based Transient Data Recording System for Load Behavior Analysis", IEEE Transactions on Power Systems 8, No. 1, Feb. 1993, New York, USA, pp. 16-22.

Vu, et al., "Use of Local Measurements to Estimate Voltage-Stability Margin", IEEE 1997, pp. 318-323.

Liu, et al., "Application of synchronised phasor measurements to real-time transient stability prediction", IEEE Proc.-Gener. Transm. Distrib., vol. 142, No. 4, Jul. 1995, pp. 355-360.

Quintana, et al., "Voltage stability as affected by discrete changes in the topology of power networks", IEEE Proc.-Gener. Transm. Distrib., vol. 141, No. 4, Jul. 1994, pp. 346-352.

Karlsson, et al., "Modelling and identification of nonlinear dynamic loads in power systems", IEEE Transactions on Power Systems, vol. 9, No. 1, Feb. 1994, pp. 157-163.

* cited by examiner

*Primary Examiner*—Albert W. Paladini
(74) *Attorney, Agent, or Firm*—Buchanan Ingersoll PC

(57) ABSTRACT

A method, device and computer program product for the prediction of the stability of an electric power network, where the method is executed after a fault or contingency has occurred, and comprises the steps of (a) during a time interval in which the network is in a transient condition, determining for at least one load connected to the electric power network, at least one parameter describing an estimated steady state behavior of the load, (b) executing a load flow calculation for the electric power network using the least one parameter describing the estimated steady state behavior the at least one load, (c) determining, if the load flow calculation indicates stability has a solution, that a future stability of the electrical power network exists, or, if the load flow calculation indicates instability does not have a solution, that a future stability of the electrical power network does not exist.

11 Claims, 2 Drawing Sheets

STABILITY PREDICTION FOR AN ELECTRIC POWER NETWORK

FIELD OF THE INVENTION

The invention relates to the field of electric power transmission networks, and, more particularly, to a method, computer program product and device for the prediction of the stability of an electric power network as described in the preamble of claims 1, 10 and 11, respectively.

BACKGROUND OF THE INVENTION

An electric power transmission network comprises high-voltage tie lines and substations for transforming voltages and for switching connections between lines. Loads and power generating plants are connected to the network. An important issue when controlling power generation and load flow is to keep the network stable, i.e. to avoid voltage collapse and swings. Existing SCADA (Supervisory control and data acquisition) systems provide estimates about the stability of a network. However, such an estimate is based on the assumption that the network is in a steady state condition. Consequently, it is not valid if it is obtained during a transient condition, i.e. in the time after a fault or contingency has occurred and before the network is back in a seemingly steady state. It often happens that the network seems to be in a steady state after a contingency, however, an instability caused by the contingency develops unnoticed. The instability is detected by the SCADA system only when the network voltages are severely affected. At this point in time, remedial actions such as load shedding must be drastic, if complete collapse of the network is to be avoided. It therefore is desirable to obtain, after a contingency is detected, an early estimate of the future stability of a network, such that remedial actions can be executed before the effects of the instability become too large.

U.S. Pat. No. 5,638,297 shows a method of on-line transient stability assessment of an electrical power system. A computer model is used to simulate an effect of an artificially introduced study contingency. The simulation uses a step-by-step integration method and predicts future effects of the contingency on the network, in particular on network stability. However, the method requires a full model of dynamic behavior of the network and a significant computational effort for the simulation. The algorithm uses pre-calculations that are made before a given contingency occurs. If a contingency was not pre-calculated or if cascaded contingencies occur, the algorithm fails. If applied to voltage stability, the algorithm would fail as well for cascaded contingencies since an exhaustive pre-calculation of combinations of contingencies is not practicable.

SUMMARY OF THE INVENTION

It is therefore an object of the invention to create a method and computer program product for the prediction of the stability of an electric power network of the type mentioned initially, which overcome the disadvantages mentioned above.

These objects are achieved by a method, computer program product and device for the prediction of the stability of an electric power network according to the claims 1, 10 and 11.

In the method for the prediction of the stability of an electric power network according to the invention, the method is executed after a contingency has occurred, and comprises the steps of a) during a time interval in which the network is in a transient condition, determining, for at least one load connected to the electric power network, at least one parameter describing an estimated steady state behavior of the load, b) executing a load flow calculation for determining a steady state equilibrium of the electric power network, using the least one parameter describing the estimated steady state behavior the at least one load, c) determining, if the load flow calculation indicates stability, i.e. if it has a solution, that a future stability of the electrical power network exists, or, if the load flow calculation indicates instability, i.e. if it does not have a solution, that a future stability of the electrical power network does not exist.

The inventive method thus determines, during a transient state of the network, one or more parameters relevant to the network's future steady state or stationary behavior. The future steady state equilibrium of the dynamic system is then determined without any need for a simulation over time. Modeling and computation effort is therefore reduced significantly, as compared to a dynamic simulation of network behavior, but nevertheless the behavior of the complete system around the equilibrium point is determined. Since calculations are necessary only after a contingency occurs, the algorithm is independent from any pre-calculations and is applicable to any contingency or combination of contingencies.

In a preferred embodiment of the invention, the load flow calculation is a so-called extended load flow calculation that includes steady state behavior of a variety of elements of the power system, in particular of under load tap changers and of power generators.

The computer program product for the prediction of the stability of an electric power network according to the invention is loadable into an internal memory of a digital computer, and comprises computer program code means to make, when said computer program code means is loaded in the computer, the computer execute the method according to the invention. In a preferred embodiment of the invention, the computer program product comprises a computer readable medium, having the computer program code means recorded thereon.

The device for the prediction of the stability of an electric power network after a contingency has occurred comprises a) means for storing values of voltage and power measurements made at the load, b) means for detecting an occurrence of a contingency, c) means for determining at least one parameter, where the parameter describes an estimated steady state behavior of the load, from the stored voltage and power values and from measurement values that are obtained when the network is in a transient condition after the contingency has occurred.

Further preferred embodiments are evident from the dependent patent claims.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
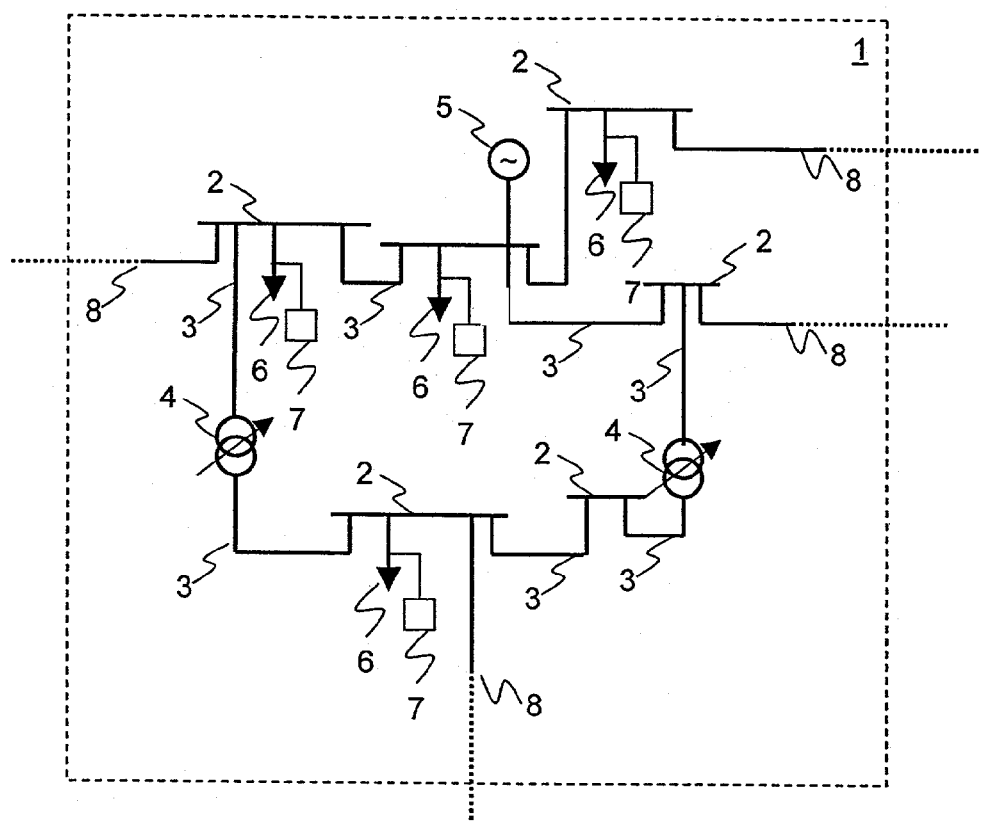
FIG. 1 schematically shows part of an electrical power transmission network.

FIG. 1 schematically shows a part 1 of an electric power network. Buses 2 are connected by lines 3 which may comprise under load tap changers (ULTC) 4. An under load tap changer is a transformer whose voltage ratio may be switched in discrete steps. Also connected to buses 2 are generators 5 such as single generators or complete power plants and loads 6. Loads 6 are consumers of power or other networks, e.g. at a lower voltage level. Each load 6 is connected to the network by a load connection which is, for example a feeder leading to a power consumer. When the section of electric power network under consideration is a high voltage transmission network, the feeder may lead to a high of medium voltage distribution network. At least one phasor measurement unit 7 is connected to a bus 2 or to a feeder. Interface lines 8 lead to neighboring networks.

The phasor measurement unit 7 measures phasors of voltage at and current through an electric connection such as a feeder or line or busbar. The phasor data represents a phasor and may be a polar number, the absolute value of which corresponds to either the real magnitude or the RMS value of a quantity, and the phase argument to the phase angle at zero time. Alternatively, the phasor may be a complex number having real and imaginary parts or the phasor may use rectangular or exponential notation. Phasors may be used to represent quantities such as the voltage, current, power or energy associated with a phase conductor or an electronic circuit. By contrast, conventional sensing devices used in power networks generally measure only scalar, average representations, such as the RMS value of a voltage, current etc. In a three-phase power system whose phases are in a balanced state, phasors from all three phases may be represented by a single common phasor.

The phasor measurement units 7 are used for three reasons. First, the measurements are taken with short time intervals of approximately 20 to 100 milliseconds. This gives a view on the system with a high resolution over time. Second, the provided phasor information requires an installation of phasor measurement units 7 at only about each third or forth station or bus for an area that is to be observed. Third, synchronized time-triggered and time-stamped measurements from the entirety of phasor measurement units 7 together form a dynamic snapshot of the system state. The first reason is related to the parameter determination of the load parameter, the second and third reason are related to the dynamic observation of the critical area and the determination of the equilibrium of the system model.

Figure 2:
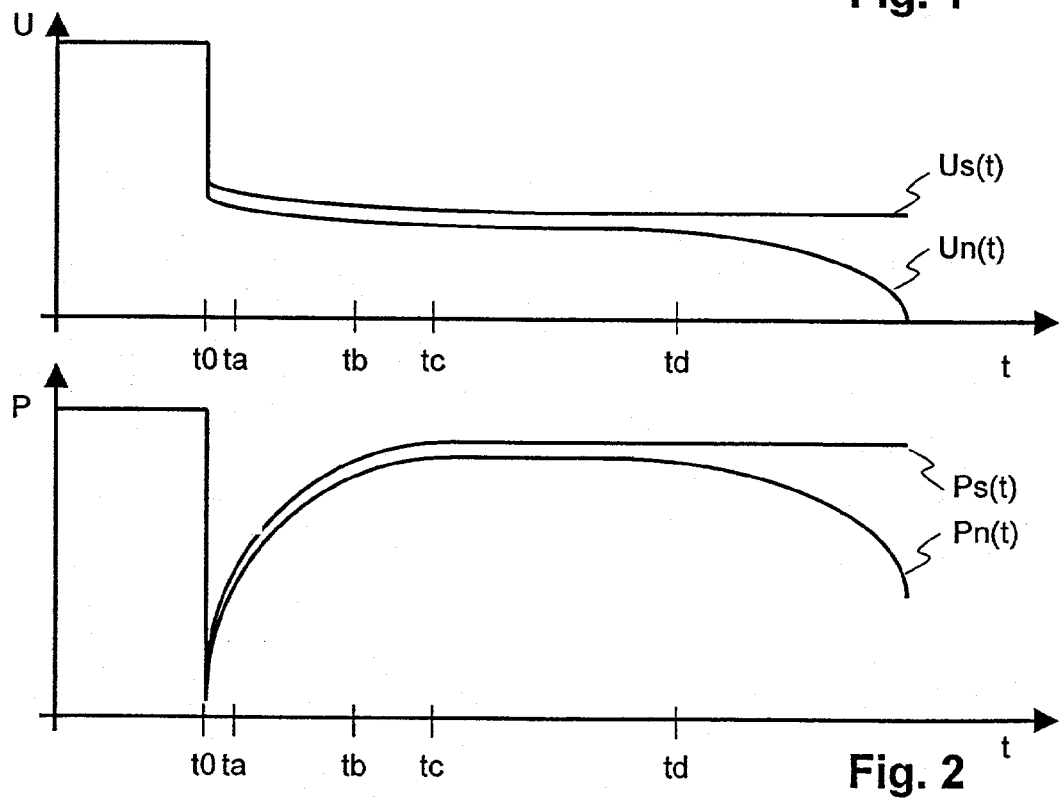
FIG. 2 shows a time history with typical values of voltage and power flow at a load connection after a contingency occurs.

FIG. 2 shows a time history over time t with typical values of voltage U and power flow P at a load connection after a contingency occurs. A contingency is an unexpected event such as, for example, a line 3 tripping, a generator 5 tripping, an extreme change in load or a feeder opening. While FIG. 2 shows the effects of an unexpected voltage drop at a load connection, similar effects occur for voltage increases, and the invention is applicable as well.

At time t0, the contingency occurs, causing the voltage U to drop. Such unexpected voltage drops or increases typically are in the range of a few percent to 10% percent of a nominal voltage. The voltage drop causes the power flow P to the load 6 to decrease as well. Due to the decrease in power P, local controllers of the load 6 try to draw more power in order to reach a nominal power consumption or operating point. This increase in power flow P in turn causes the voltage U to drop even more. At time tc the values for voltage U and power P have reached a seemingly steady state. However, only one of the two curves corresponds to a steady state while the other one corresponds to an unstable state, due to long term dynamic effects of the load, the ULTCs and the generators. "Long-term" in this context refers to time ranges of several seconds to several tens or hundreds of seconds.

If the state is stable, the voltage U and power P remain approximately constant, as shown by the trajectories Us(t) and Ps(t). At a later time, an increase in generated power or a reduction of power consumption will cause the voltage U and power P to return to nominal values. In the unstable case, after a time td the voltage U and with it the power P will further decrease, as shown by the trajectories Un(t) and Pn(t). Whether the situation is stable or unstable is a property of the entire network, not just of the load 6 itself. However, the dynamic behavior of each load 6 influences the network and its stability. It therefore is necessary to analyze the interplay between the network and all loads, as well as generators. This interplay between the loads, the generators and the network is described with a set of static equations called load flow equations or power flow equations. These equations express the relation between the voltages at the connections of the elements and the power they consume or generate. Methods to solve such an equation system are well known as "load flow calculation" or "load flow analysis" and use, for example a Newton-Raphson algorithm.

In order to determine the stability of the network, said equations are combined and the resulting set of equations is solved using load flow analysis. If the power network comprises ULTCs 4, their controlled behavior is described by step functions that represent a voltage ratio as a function of one of the transformer voltages. The extended load flow analysis in this case incorporates a representation or model of the ULTCs behavior, as shown in "Voltage Stability of Electric Power Systems", Vournas, C.; Van Cutsem, T., Kluwer Academic Publishers, Boston, 1998. The load flow analysis uses an optimization technique that determines a steady state solution that satisfies all equations including the ULTC equations.

Modeling of a generator 5 or power generating unit such as a power plant may be simplified to the point that a behavior of a generator 5 is described only by the maximum reactive power that it is allowed to generate continuously, i.e. in a steady state. These values are known in advance from the operational diagram of the generator. The maximum influences the load flow calculation by giving a boundary condition on the space of solutions to the load flow problem. In a preferred embodiment of the invention, the voltage controller of generator 5 is represented by the static relationship between generator power output and generator voltage. This represents the steady state part of a voltage controller and excitation system of the generator model.

The behavior of neighboring networks connected to the network under consideration by interface lines 8 is modeled by static or dynamic relationships such as constant power or current on the interface line, representation as constant impedance or as a Thevenin equivalent of the neighboring network.

The resulting equation system contains the load flow equations, extended by steady state or static representations of all the elements of the power system which influence the stability. The solution of this equation system is a stable equilibrium and therefore a steady state solution of a complete dynamic representation of the power system. Therefore it is valid to determine the future equilibrium or steady-state solution with the load flow calculation with the embedded static models instead of executing a dynamic simulation over time. This solution of the extended set of equations is called extended load flow calculation.

If the load flow calculation reaches a solution, then the network is stable, if not, then the network is unstable. The load flow calculation requires a number of network, generator and load parameters. Some of these are constant, some may be determined prior to a contingency, but some remain unknown at the time the contingency occurs. In particular, the voltage/power characteristics of the loads 6 change slowly, that is with time constants in the range of hours. These characteristics can, in general, not be measured or identified as long as the power network is in its normal and nominal steady state, since unchanging values do not provide enough information. However, since the contingency causes changes in voltage U and power P to each of the loads 6, it is possible to identify load parameters for each load 6 immediately after a contingency occurs.

According to the invention, measurement data obtained in a transient phase between t0 and tc is used to identify the load parameters. A further aspect of the invention is that only load parameters relevant to a static or stationary behavior of each load 6 are identified. Since these parameters change only slowly with respect to the seconds or minutes between the contingency at t0 and the manifestation of the instability at td, the parameters are used in a static load flow calculation to determine the stability of the network, i.e. of the part of the network under consideration. The stability can therefore be assessed long before an instability manifests itself visibly, as it does after td.

Figure 3:
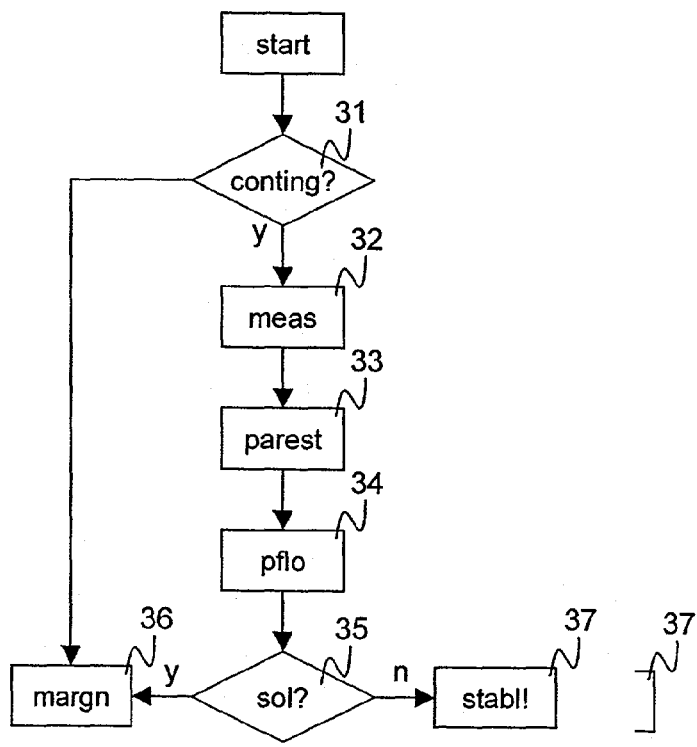
FIG. 3 shows a flow diagram of the inventive method.

FIG. 3 shows a flow diagram of the inventive method. In step 31, voltages and currents at load connections are measured by phasor measurement units 7, each of which is associated to one load 6 whose behavior is to be identified. From these measurements, steady state absolute voltages $U_0$, steady state active power $P_0$ and steady state reactive power $Q_0$ are continuously updated. Network topology is updated from a known or measured state of switches and breakers. If no contingency is detected, execution continues in step 36, where a stability margin is computed in a known fashion. When a contingency is detected by known means, e.g. when a large and fast voltage change occurs at at least one load 6, execution proceeds to step 32. In step 32, a sequence of voltage and power values is measured at the load connections. Based on these measured values, in step 33, for each load 6 whose behavior is to be identified, at least one parameter describing the stationary behavior of the load is estimated. In step 34, the extended load flow calculation is performed, using among others said load parameters. In step 35 it is checked whether the extended load flow calculation has arrived at a solution. If it has, then in step 36 a stability margin is computed on the base of the found solution in a known fashion, taking also into account the steady-state models which are included in the extended load flow calculation. The stability margin is optionally communicated to an operator. If it has not, then in step 37 remedial actions such as shedding loads are taken in order to achieve stability. Other remedial actions are, for example reactive power increase, blocking of ULTC-tapping, control of FACTS-devices, Automatic Generation Control (AGC), Secondary Voltage Control, change of voltage set values of controllable devices or controlled islanding.

In a preferred embodiment of the invention, the load model implicitly used in step 33 is a so-called Hill and Karlsson model, described in "Modelling and identification of nonlinear dynamic loads in power systems"; Hill, D. J. and Karlsson, D., IEEE Trans. on Power Systems, Vol. 9, No. 1, pp. 157–163, 1994. The model describes the behavior of a load as seen from a feeder of a high voltage system by a differential equation $$-T_p \dot{P} + P_0 \left(\frac{U}{U_0}\right)^{\alpha_S} + \frac{P_0}{U_0} \dot{U} T_p \alpha_t \left(\frac{U}{U_0}\right)^{\alpha_S - 1} = P \quad (1)$$

The equation gives the dynamic relation between the voltage U at and the power P through a connection to the load. $U_0$ and $P_0$ are a nominal voltage and nominal active power, respectively, as measured prior to the contingency. It is assumed that $P_0$ does not change stepwise and remains essentially unchanged for the purposes of the invention, i.e. during and after the transient phase caused by a contingency. $\dot{P}$ and $\dot{U}$ are time derivatives and are preferably determined as mean values of gradients determined from a series of measurement points. Voltage values considered in the context of the invention are absolute voltage values of voltage phasors representing a three-phase system. Parameters are a time constant $T_p$ and exponents $\alpha_S$ and $\alpha_t$. These parameters are to be determined, since they change during a day and over the seasons. Steady state behavior is determined by $\alpha_S$. Typical values for $\alpha_S$ can be expected to lie between approximately 0 and 2 for active power. If the same analysis is done for the reactive power part of the load, typical values of a corresponding exponent $\beta_S$ are 0 to 4. $T_p$ is typically between 20 and 300 seconds and $\alpha_t$ between 0 and 5. Detailed measured values are given in the reference on the Hill and Karlsson Model cited above.

In a first preferred embodiment of the invention, the parameters are determined as follows: For a step change in voltage, the solution of Eq. (1) is, for t>t0, given by $$P_L(t) = P_L(\infty) + [P_L(t_{0+}) - P_L(\infty)] \cdot e^{\frac{-(t-t_0)}{T_p}} \quad (2)$$

where $P_L(t_{0+})$ is the power immediately after the contingency. In a preferred embodiment of the invention, $P_L(t_{0+})$ is determined as the lowest power value measured after a contingency. $P_L(\infty)$ is a steady state power value reached after a transient phase.

Figure 4:
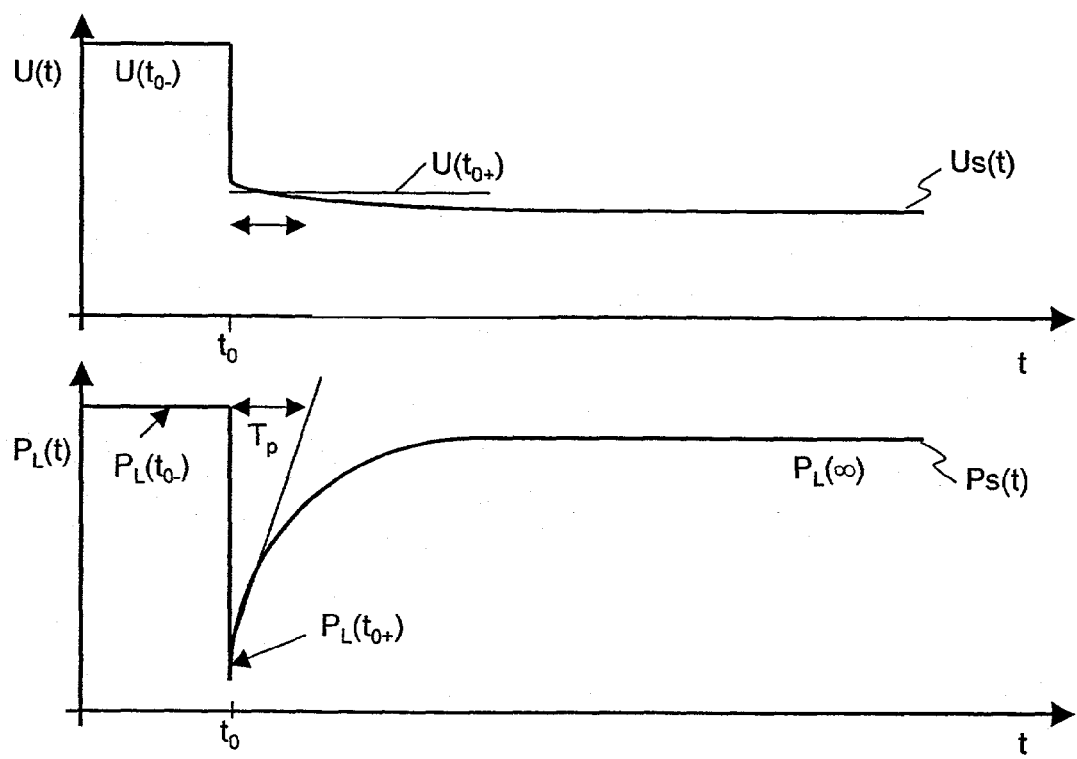
FIG. 4 shows a time history of voltage and power flow and its relation to parameters of a load model.

FIG. 4 shows time histories of voltage U and power P representing a step change in voltage followed by a trajectory according to Eq. (2). $U(t_{0-})$ and $P_L(t_{0-})$ are the voltage and the power prior to the contingency occurring at time $t_0$. A gradient of $P_L(t)$ determines the time constant $T_p$. The desired value $P_L(\infty)$ can now be determined by solving equation (2) for $P_L(\infty)$ with the measured load $P_L(t)$ at the time t. This value can be updated over time.

$U(t_{0+})$ is the voltage after the contingency. From the steady state part of (1), i.e. by setting $\dot{P}$ and $\dot{U}$ to zero, it follows that $$\frac{P_L(\infty)}{P_L(t_{0-})} = \left(\frac{U(t_{0+})}{U(t_{0-})}\right)^{\alpha_S} \quad (3)$$

since $P_L(t_{0-})=P_0$ and $U(t_{0-})=U_0$, $\alpha_S$ is determined by Eq. (3). From Eq. (1) it can be seen that $\alpha_S$ influences a stationary part of the expression, whereas $\alpha_t$ is associated with a dynamic part and becomes irrelevant when derivatives over time are zero.

In summary, in the first preferred embodiment of the invention, $\alpha_S$ is determined by the following steps:

1. From the power $P_L(t_{0+})$ immediately after the contingency and a sequence of Power measurements $P_L(t)$, determine the time constant $T_p$ and $P_L(\infty)$ from Eq. (2).

2. From $P_L(\infty)$, a measurement of $U(t_{0+})$ and power and voltage values made prior to the contingency, determine $\alpha_S$ from Eq. (3).

For practical purposes, $U(t_{0+})$ is determined as a minimum of values obtained by filtering voltage measurements that are measured from immediately after the contingency has been detected for approximately 1 to 5 seconds. For example, a sliding window is moved over the measurements, for every window position, an average of values in the window is determined as a filtered value, and a minimum of filtered values is taken to be $U(t_{0+})$.

The load flow calculation uses either the constant value $P_L(\infty)$ for the load flow, which gives approximate results, or the expression $$P_L = P_L(t_{0-})\left(\frac{U}{U(t_{0-})}\right)^{\alpha_S} \quad (4)$$

derived from Eq. (3), which determines the load flow P in function of the voltage U measured immediately after the contingency, giving more accurate results.

The above method showed how to determine load characteristics for active power after a contingency. Characteristics describing reactive power consumption of the load are determined in the same fashion, replacing in all the measurements and equations mentioned above the active power P by reactive power Q. A variable $\beta_S$ corresponding to $\alpha_S$ is then determined which determines the steady state relationship between voltage and reactive power.

In a second preferred embodiment of the invention, not just a single pair but a plurality of voltage and power measurements is used to estimate $\alpha_S$. In a sliding window of measurements, a series of measurements of voltage U and power P as well as their derivatives are obtained. For more than three measurement points, an over-determined set of nonlinear equations, i.e. several times Eq. (1), results, where each instance of Eq. (1) holds for a different measurement point. The set of equations can be solved for the parameters, in particular for $\alpha_S$.

In a third preferred embodiment of the invention, Eq. (1) is rewritten as $$-x_1 \dot{P} + P_0 x_2 + \frac{P_0}{U_0}\dot{U} x_3 = P \quad (5)$$

where the variable of interest $\alpha_S$ is contained in $$x_2 = \left(\frac{\bar{U}}{U_0}\right)^{\alpha_S} \quad (6)$$

where $\bar{U}$ is a mean of voltages measured in the sliding measurement window. Assuming the voltage U to be constant for the purpose of transforming Eq. (1) to the form of Eq. (5) is an approximation, and is only valid for small changes in the voltage U within the sliding window. Since the change in voltage U decreases after the contingency, the accuracy of the approximation increases from time t0 to tb. The measurements in the sliding window, made at times t1, t2, t3, . . . tn define an over-determined linear system of equations $$A \cdot x = b \text{ with } A = \begin{bmatrix} -\dot{P}(t_1) & P_0 & \frac{P_0}{U_0}\dot{U}(t_1) \\ -\dot{P}(t_2) & P_0 & \frac{P_0}{U_0}\dot{U}(t_2) \\ -\dot{P}(t_3) & P_0 & \frac{P_0}{U_0}\dot{U}(t_3) \\ \ldots & \ldots & \ldots \\ -\dot{P}(t_n) & P_0 & \frac{P_0}{U_0}\dot{U}(t_n) \end{bmatrix} b = \begin{bmatrix} P(t_1) \\ P(t_2) \\ P(t_3) \\ \ldots \\ P(t_n) \end{bmatrix}$$

which can be solved e.g. by the least squares approach. From $x_2$, $\alpha_S$ is immediately determined.

In the preferred embodiments of the invention, measurement values providing good estimates of the steady state parameters are obtained starting at a time ta which lies from ca. 5 to 15 seconds after the time t0 at which the contingency occurs, since the approximation inherent in Eqs. (5) and (6) improves with time. The short-term transients of voltage and power in the first ca. 2 to 5 seconds after the contingency must have subsided before the sliding window can start to collect data. A typical length of the sliding window is between 3 and 10 seconds. Therefore the starting time plus the sliding window results in the above values of about 5 to 15 seconds after which the first results are available.

After this time, $\alpha_S$ should have been estimated, so that the remaining steps of the method can be executed and enough time remains for remedial actions.

Beginning with the results from the first sliding window, the extended load flow calculation can be started. In order to increase robustness at the expense of speed, the average of several following results from the sliding window can be taken. In a preferred embodiment of the invention, averages are taken over up to approximately 5 seconds. For a continuous supervision of the stability, an average of the last results is taken for continuous calculations of stability. In order to schedule and execute stabilizing actions as soon as possible, the first results available are preferably used.

In summary, the method according to the invention comprises the steps of, after a contingency has been detected, a) During a time interval in which the network is in a transient condition, determining for at least one load connected to the electric power network, at least one parameter $\alpha_S$ that describes an estimated steady state, i.e. stationary behavior of the load.

b) Executing a load flow calculation for the electric power network using the least one parameter $\alpha_S$ that describes the estimated steady state behavior at the at least one load. The load flow calculation is also based on values that characterize the state of the network prior to the contingency, such as power and voltage at the at least one load.

c) Determining, if the load flow calculation indicates stability, i.e. if it has a solution, that a future stability of the electrical power network exists, or, if the load flow calculation indicates instability, i.e. if it does not have a solution, that a future stability of the electrical power network does not exist.

In a preferred embodiment of the invention, the step a) of determining, for one load connected by a load connection to the electric power network, the at least one parameter describing the estimated steady state behavior of the load, comprises measuring a voltage and a power flow from phasor measurements at the load connection, where measurement intervals, i.e. the time between measurements are approximately 20 to 250 milliseconds.

In a further preferred embodiment of the invention, the load flow calculation is extended by the steady state behavior of all elements of the power system. This means that the solution of the load flow calculation is the equilibrium or steady-state solution of the full dynamic system.

A device for the prediction of the stability of an electric power network according to the invention comprises means for determining, after a contingency has occurred and during a time interval in which the network is in a transient condition, for one load associated with the device, at least one parameter that describes an estimated steady state behavior of the load. In a preferred embodiment of the invention, the device determines the parameter $\alpha_S$ according to one of the first, second or third preferred embodiments of the invention described above.

The device comprises means for storing values of voltage and power measurements made at the load, means for locally detecting an occurrence of a contingency, preferably by detecting a voltage drop of, for example, 2%., means for determining the at least one parameter $\alpha_S$, where the parameter describes an estimated steady state behavior of the load, from the stored voltage and power values and from measurement values that are obtained when the network is in a transient condition after the contingency has occurred, and, in a preferred embodiment, means for transmitting the parameter $\alpha_S$ to a remote device.

Such an inventive device is preferably a phasor measurement unit 7 itself, or a device associated with a phasor measurement unit 7. The values of parameter $\alpha_S$ obtained by a plurality of such devices are transmitted by each device to the remote device, for example to a central data processor, in which the load flow analysis and further steps of the inventive method are performed.

List of designations 1 section of electric power network
2 bus
3 line
4 ULTC (under load tap changer)
5 generator
6 load
7 phasor measurement unit
8 interface line
31 "conting?", check for contingency
32 "meas", perform measurements
33 "parest", estimate parameters
34 "pflo", perform load flow calculation
35 "sol?", check existence of solution
36 "marg", compute power margin
37 "stabl!", perform stabilizing actions

The invention claimed is:

1. A method for the prediction of the stability of an electric power network, where said method is executed after a contingency has occurred, wherein the method comprises the steps of a) during a time interval in which the network is in a transient condition, determining for at least one load connected to the electric power network, at least one parameter that describes an estimated steady state behavior of the at least one load, b) executing a load flow calculation for determining a steady state equilibrium of the electric power network, using the least one parameter, c) determining, if the load flow calculation has a solution, that a future stability of the electrical power network exists, or, if the load flow calculation does not have a solution, that a future stability of the electrical power network does not exist.

2. Method according to claim 1, wherein the method comprises the step of determining a power margin of the electric power network, using the at least one parameter describing the estimated steady state behavior of the at least one load.

3. Method according to claim 1, wherein the method comprises the step of taking a remedial action in order to prevent a predicted instability from occurring.

4. Method according to claim 1, wherein determining, for one load connected by a load connection to the electric power network, the at least one parameter describing the estimated steady state behavior of the load, comprises measuring a voltage and a power flow at the load connection, where measurement intervals are approximately 20 to 250 milliseconds.

5. Method according to claim 1, wherein a time interval in which the at least one parameter describing the estimated steady state behavior of the at least one load is determined begins at the time when a contingency is detected and has a length of approximately 1 to 20 seconds.

6. Method according to claim 1, wherein the at least one load is modeled by the equation $$-T_p \dot{P} + P_0 \left(\frac{U}{U_0}\right)^{\alpha_S} + \frac{P_0}{U_0} \dot{U} \ T_p \ \alpha_t \left(\frac{U}{U_0}\right)^{\alpha_S - 1} = P$$

where
- U is a voltage at and P a power flow through a connection to the load,
- $\dot{U}$ and $\dot{P}$ are their derivatives over time,
- $U_0$ and $P_0$ are a nominal voltage and nominal active power, respectively,
- $T_p$ is a time constant,
- and where $\alpha_S$ is the parameter describing the estimated steady state behavior.

7. Method according to claim 1, wherein the load flow is an extended load flow calculation that incorporates at least one of models for under load tap changers and models that describe the behavior of at least one power generating unit.

8. Method according to claim 7, wherein at least one of the power generating units is described by the maximum steady state reactive power that said power generating unit may provide in a steady state.

9. Method according to claim 1, wherein the load flow calculation incorporates network parameters that are obtained prior to the occurrence of the contingency, and where said network parameters are a nominal voltage $U_0$ and a nominal active power measured prior to the contingency.

10. Computer program product for the prediction of the stability of an electric power network according to the invention that is loadable into an internal memory of a digital computer, and comprises computer program code means to make, when said computer program code means is loaded in the computer, the computer execute the method according to claim 1.

11. Method according to claim 1, wherein determining, for the at least one load connected by a load connection to the electric power network, the at least one parameter describing the estimated steady state behaviour of the at least one load, comprises measuring a voltage and a power flow at the load connection by means of a phasor measurement unit.

* * * * *